(12) United States Patent
Ryu

(10) Patent No.: US 6,483,531 B1
(45) Date of Patent: Nov. 19, 2002

(54) IMAGE COMMUNICATION DEVICE AND METHOD FOR COMMUNICATION TERMINAL

(75) Inventor: Jung-Hoon Ryu, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/416,566

(22) Filed: Oct. 12, 1999

(30) Foreign Application Priority Data

Oct. 12, 1998 (KR) .......................................... 98-42503

(51) Int. Cl.⁷ ................................................ H04N 7/14
(52) U.S. Cl. ................................ 348/14.01; 348/14.03; 348/14.02
(58) Field of Search ............................. 348/14.1, 14.02, 348/14.03, 14.05, 14.08; 379/93.17, 93.23, 93.21, 202; 370/260; H04N 7/14

(56) References Cited

U.S. PATENT DOCUMENTS 5,999,207 A * 12/1999 Rodriguez et al. ............ 348/14
6,108,411 A * 8/2000 Otsuka et al. ............... 379/355

FOREIGN PATENT DOCUMENTS

| EP | 0660582 A2 | * | 4/1998 | .......... H04N/1/333 |
| JP | 403018192 A | * | 1/1991 | ............ H04N/7/14 |
| JP | 409147095 A | * | 6/1997 | ............. G06T/1/00 |
| JP | 10098702 A | * | 4/1998 | .......... H04M/11/06 |
| JP | 410210437 A | * | 8/1998 | ............ H04N/7/14 |

OTHER PUBLICATIONS

Bober et al.; Video coding for mobile communications–MPEG4 Perspective, 3/1–3/2, Dec. 1996.*

* cited by examiner

Primary Examiner—Melur Ramakrishnaiah
(74) Attorney, Agent, or Firm—Dilworth & Barrese, LLP

(57) ABSTRACT

A communication terminal supporting image communication having a storage for storing image files. The communication terminal performs a call while transmitting a real-time image to a called party in a first transmission mode, and performs a call while transmitting a specific stored image file to a called party, in a second transmission mode.

10 Claims, 3 Drawing Sheets

IMAGE COMMUNICATION DEVICE AND METHOD FOR COMMUNICATION TERMINAL

BACKGROUND OF THE INVENTION

1. Field of the Invention

The present invention relates generally to a communication terminal supporting image communication, and in particular, to a device and method for selectively transmitting an image during a call.

2. Description of the Related Art

A communication terminal supporting image communication can transmit a photographic image taken using a camera during a call to the other party. The image communication function is very useful in that it allows a user to see the other party during a call. However, the image communication function is not always desirable. In those circumstances where a party does not wish to show his or her face, the image is transmitted regardless of the user's intention, which may be construed as an invasion of privacy. For example, when the user is not dressed or without makeup, the user will not want his or her image transmitted.

SUMMARY OF THE INVENTION

It is, therefore, an object of the present invention to provide a device and method for selectively transmitting an image file, in a communication terminal supporting image communication.

It is another object of the present invention to provide a device and method for storing images including paintings, photographs, etc. and documents in an image file and transmitting the stored image file in a communication terminal supporting image communication.

To achieve the above objects, there is provided a device and associated method for communicating images in a communication terminal adapted to store image files. The method generally comprises transmitting a real time image to the other party, in a first transmission mode; and transmitting a specific stored image file to the other party, in a second transmission mode.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
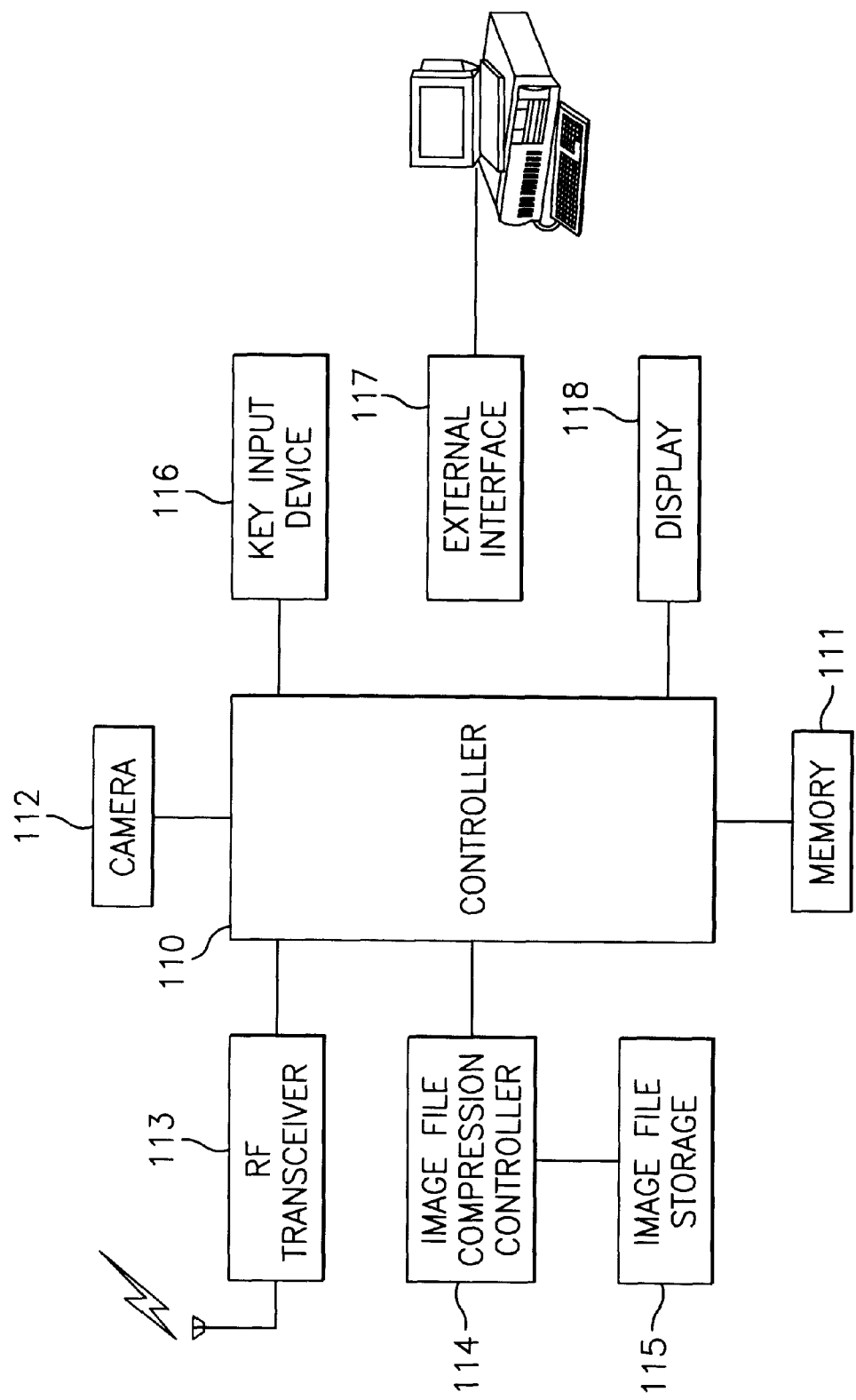
FIG. 1 is a block diagram illustrating a communication terminal supporting image communication according to an embodiment of the present invention.

FIG. 1 illustrates a block diagram of a communication terminal supporting an image communication function according to an embodiment of the present invention.

Referring to FIG. 1, a controller 110 controls the overall operation of the communication terminal. A memory 111 stores program data for controlling the overall operation, and temporal data generated during execution of the program. During transmission, an RF (Radio Frequency) transceiver 113 converts transmission data to an analog baseband signal, up-converts the baseband analog signal to a radio signal, and transmits the radio signal through an antenna. During reception, the RF transceiver 113 converts a signal received through the antenna to an analog baseband signal, restores the converted analog baseband signal to original data, and provides the restored original data to the controller 110. An image file compression controller 114 compresses an image file provided from the controller 110 and stores the compressed image file in an image file storage 115. A camera 112 converts an optical image signal of a subject, which is input through a lens, to an electric signal using a solid-state imaging device, and then performs digital signal processing for the electric signal to generate image data, which is output to the controller 110. Here, the image taken by the camera 112 is typically a face of the user having a telephone conversation. A key input device 116 is comprised of a key matrix including a plurality of numeric keys, and 5 generates key data according to key operations of the user. The generated key data is provided to the controller 110. A display 118 displays an operating state of the communication terminal on an LCD (Liquid Crystal Device), under the control of the controller 110. An external interface 117 interfaces between the communication terminal and a personal computer (PC). An RS232C card which is a serial transmission module is typically used for the external interface 117.

Such a communication terminal stores an image output from the camera 112 in the image file storage 115, or stores an image file downloaded from the personal computer or Internet in the image file storage 115. As a consequence of the small size of the display 118, a 320×200 (pixels)×8 (bits) image can be stored with about 64 Kbytes without compression. However, when compressed by RLE (Run Length Encoding), the image can be stored with much less than 64 Kbytes. Therefore, to store about 5 non-compressed images, there is required a memory capacity of approximately 500 Kbytes in maximum.

The image file storage 115 stores an image in a data file, and to immediately transmit the image file, interfacing with a modem is required. While transmitting the stored image file, the camera 112 is inactivated to reduce power consumption. It is preferable to use the same image format when storing the images in the image file storage 115, and the image file compressor 114 compresses the images in RLE format to reduce the data size. It should be appreciated that other image compressor formats can be used, for example, MPEG4. Herein, transmitting an image presently taken by the camera 112 will be referred to as a first transmission mode, and transmitting a specific image file stored in the image file storage 115 will be referred to as a second transmission mode.

Now, a detailed description of the present invention will be made with reference to the accompanying drawings.

Figure 2:
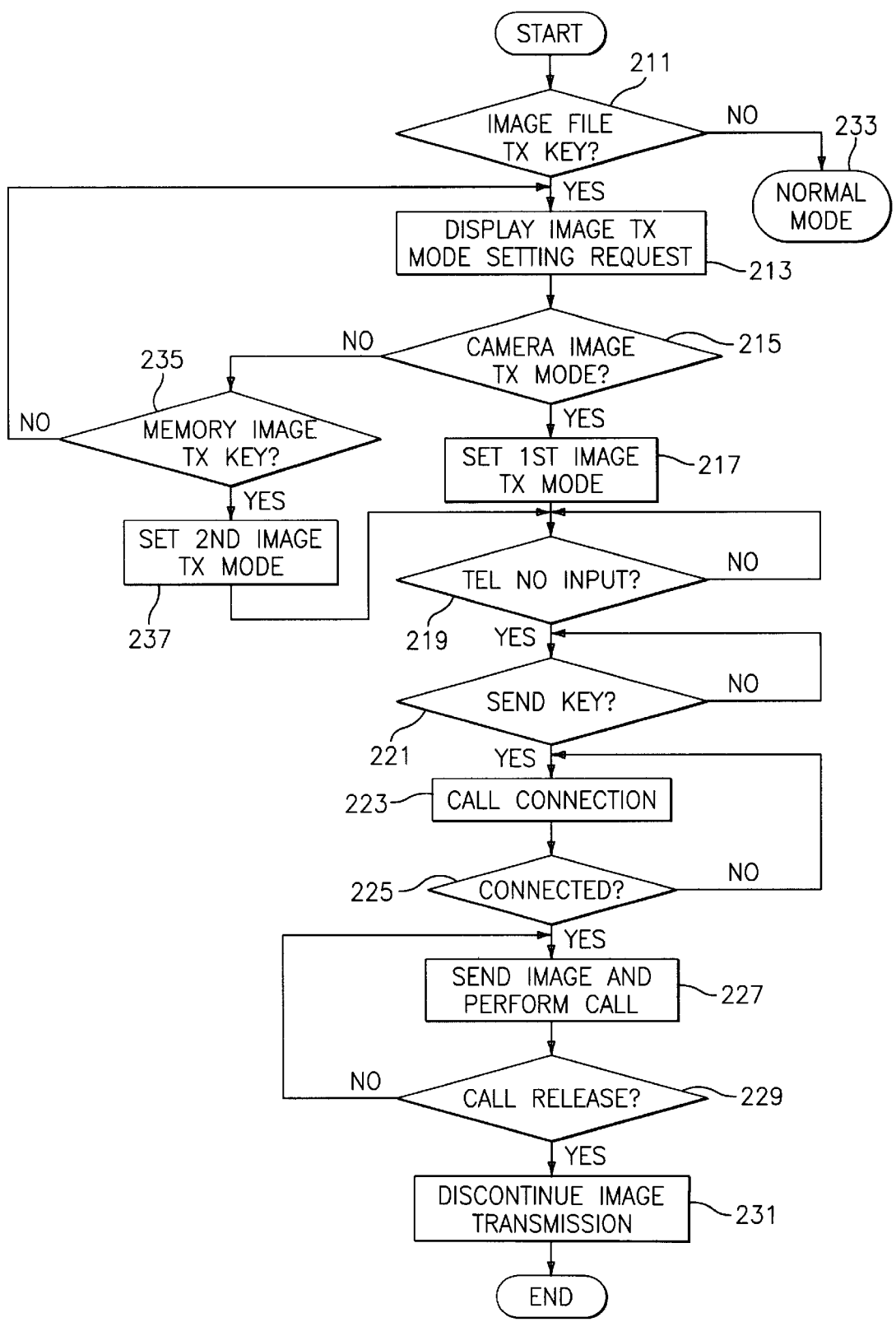
FIG. 2 is a flow chart illustrating a procedure for transmitting a specific image during an outgoing call in a communication terminal according to an embodiment of the present invention.

FIG. 2 is a flow chart illustrating a procedure for transmitting a specific image during an outgoing call in a communication terminal according to an embodiment of the present invention.

Referring to FIG. 2, the controller 110 determines in step 211 whether an image file transmission key input is detected. When the image file transmission key is detected, the controller 110 proceeds to step 213, otherwise the controller 110 proceeds to step 233 where a normal mode is performed.

In step 213, the controller 110 displays an image transmission mode setting request on the display 118. Thereafter, the controller 110 determines in step 215 whether a camera image transmission key input is detected. When the camera image transmission key is detected, the controller 110 proceeds to step 217, otherwise the controller 110 goes to step 235 to determine whether a memory image transmission key input is detected. When the memory image transmission key is input, the controller 110 proceeds to step 237, otherwise the controller 110 returns to step 213 to continuously display the image transmission mode setting request. Here, "camera image transmission" describes a first transmission mode for transmitting a real-time image (i.e. an image presently taken by the camera 112), and "memory image transmission" describes a second transmission mode for transmitting a specific image file stored in the image file storage 115.

If the camera image transmission key input was detected at step 215, in step 217, the controller 110 sets the first transmission mode for transmitting an image presently taken by the camera 112, at step 217, and then proceeds to step 219. Otherwise, if the memory image transmission key was detected at step 235, the controller 110 sets the second transmission mode for transmitting a specific image file stored in the image file storage 115, at step 237, and then proceeds to step 219.

Thereafter, the controller 110 determines in step 219 whether a telephone number is input. When a telephone number is input, the controller 110 proceeds to step 221, otherwise the controller 110 continuously waits for a telephone number to be input.

Upon receipt of a telephone number, the controller 110 determines in step 221 whether a SEND key (or call start key) is input. When the SEND key is input, the controller 110 proceeds to step 223, otherwise the controller 110 continuously waits for the SEND key to be input.

In step 223, the controller 110 connects an outgoing call, and then determines in step 225 whether the call is normally connected or not. That is, it is determined whether the other party has input the SEND key to connect a speech path. When the call is connected, the controller 110 proceeds to step 227, otherwise the controller 110 proceeds to step 223.

In step 227, the controller 110 performs a call mode while transmitting an image to the other party. At this point, the image being transmitted can be either an image stored in the image file storage 115 or an image presently taken by the camera 112.

During the call, the controller 110 determines in step 229 whether call release is detected or not. That is, it is determined whether an END key (or call end key) is input to disconnect a speech path. Upon detection of call release, the controller 110 proceeds to step 231 to discontinue image transmission. Upon failure to detect call release, the controller 110 returns to step 227 to continuously perform the call mode while transmitting an image.

Figure 3:
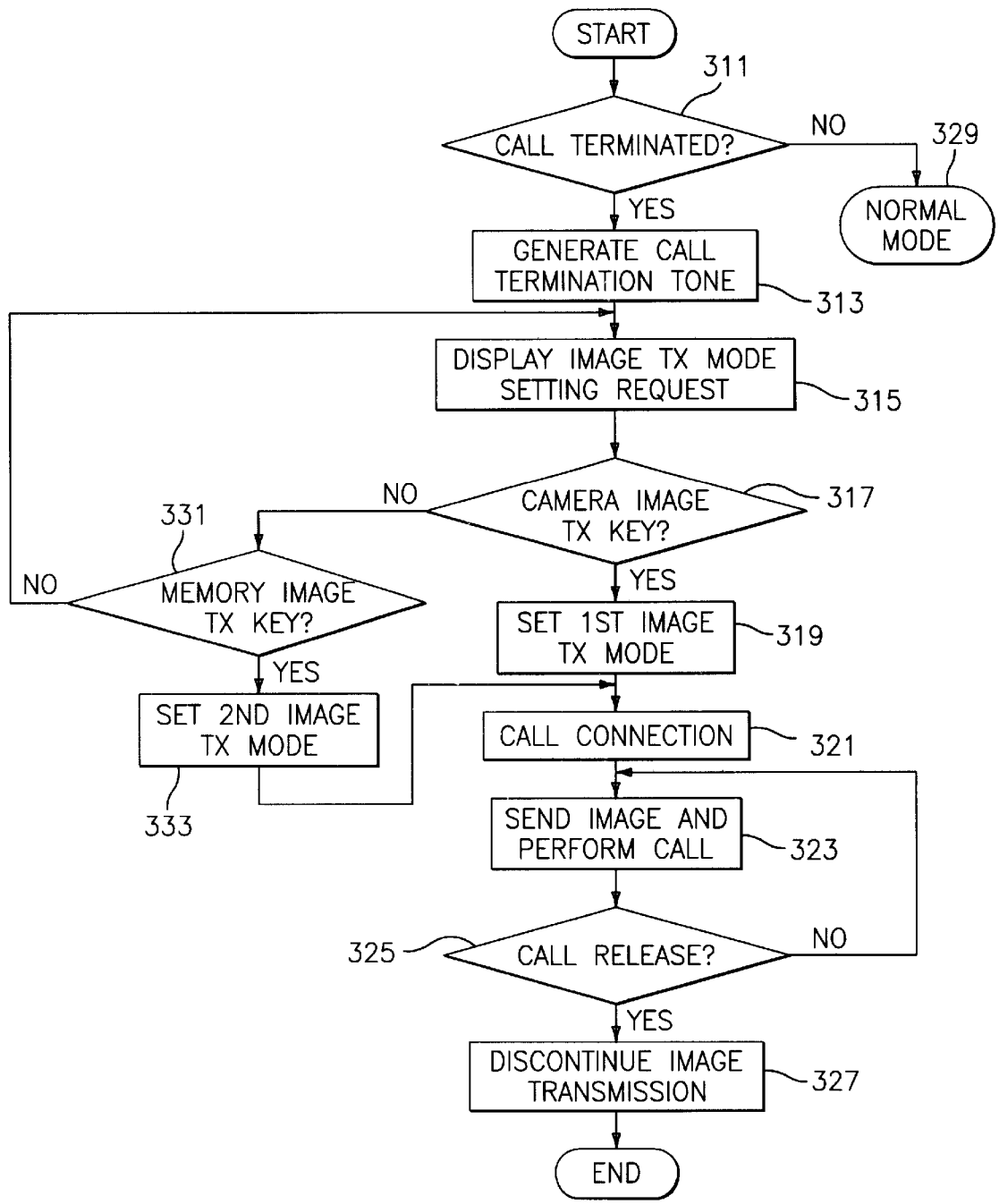
FIG. 3 is a flow chart illustrating a procedure for transmitting a specific image during an incoming call in a communication terminal according to an embodiment of the present invention.

FIG. 3 is a flow chart illustrating a procedure for transmitting a specific image during an incoming call in a communication terminal according to an embodiment of the present invention.

Referring to FIG. 3, the controller 110 determines in step 311 whether an incoming call is received. Upon receipt of an incoming call, the controller 110 proceeds to step 313, otherwise the controller 110 goes to step 329 to perform a normal mode of operation.

In step 313, the controller 110 generates a call termination tone. Thereafter, in step 315, the controller 110 displays an image transmission mode setting request on the display 118. Thereafter, the controller 110 determines in step 317 whether or not a camera image transmission key is input by the user. For example, it is possible to use the SEND key for the camera image transmission key rather than designating a new key. In other words, it is assumed that the default setting of the image transmission mode corresponds to the first transmission mode for transmitting an image presently taken by the camera 112.

When the camera image transmission key is input, the controller 110 proceeds to step 319, otherwise the controller 110 goes to step 331 to determine whether a memory image transmission key is input. When the memory image transmission key is input, the controller 110 proceeds to step 333, otherwise the controller 110 returns to step 315 to continuously display the image transmission mode setting request.

In step 319, the controller 110 sets the first transmission mode for transmitting an image presently taken by the camera 112, and then proceeds to step 321. In step 333, the controller 110 sets the second transmission mode for transmitting a specific image file stored in the image file storage 115, and then proceeds to step 321.

After setting the image transmission mode in step 319 or 333, the controller 110 automatically connects the call in step 321, without separate key input. Thereafter, in step 323, the controller 110 performs a call mode while transmitting an image to the other party. At this point, the image being transmitted can be either an image stored in the image file storage 115 or an image presently taken by the camera 112.

During the call, the controller 110 determines in step 325 whether call release is detected or not. Upon detection of call release, the controller 110 proceeds to step 327 to discontinue image transmission. Upon failure to detect call release, the controller 110 returns to step 323 to continuously perform the call mode while transmitting an image.

In addition, an existing communication terminal having a facsimile transmission function can transmit a scanned file using the novel image transmission function, without using its own facsimile transmission function. That is, the scanned file is stored as an image file, and then the stored file is transmitted to the other party. For example, it is possible to store the contents of a specific Internet site or a normal document as an image file and then transmit the stored image file, without using the facsimile transmission function.

As described above, the novel communication terminal supporting image communication can separately store an image (e.g., the user's own image and various picture files) that the user prefers, and transmit the stored image when necessary. In addition, the communication terminal can download a desired document from an Internet site or a personal computer and transmit the document file, providing the facsimile transmission function. In this manner, it is possible to prevent an invasion of privacy and provide the facsimile transmission function.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for communicating an image in a communication terminal including a storage for storing image files, comprising the steps of:

performing a call while transmitting a real-time image to a called party, in a first transmission mode; and performing a call while transmitting a specific image file stored in the storage to the called party, in a second transmission mode;

wherein selection of the first or second transmission mode is prompted during one of placing or receiving the call.

2. The method as claimed in claim 1, wherein the image file is downloaded from a personal computer.

3. A method for communicating an image in a communication terminal having a storage for storing image files, comprising the steps of:

displaying a request for setting an image transmission mode during one of making an outgoing call and upon receiving an incoming call;

performing a call while transmitting a real-time image, when the image transmission mode is set to a first transmission mode; and performing a call while transmitting a specific image file stored in the storage, when the image transmission mode is set to a second transmission mode.

4. The method as claimed in claim 3, wherein the image file is downloaded from a personal computer.

5. A method for communicating an image in a communication terminal having a storage for storing image files, comprising the steps of:

upon receipt of an incoming call, displaying a request for setting an image transmission mode;

performing a call while transmitting an image presently taken by a camera, when the image transmission mode is set to a first transmission mode; and performing a call while transmitting a specific image file stored in the storage, when the image transmission mode is set to a second transmission mode.

6. The method as claimed in claim 5, wherein the image file is downloaded from a personal computer.

7. A method for communicating an image in a communication terminal having a storage for storing image files, comprising the steps of:

displaying a request message for setting an image transmission mode during an outgoing call;

setting the image transmission mode according to a key input by a user;

attempting to connect a call upon receipt of a telephone number by said user and a call start key;

upon detecting a call connection, performing a call while transmitting a real-time image, when the image transmission mode is set to a first transmission mode; and performing a call while transmitting a specific stored image file, when the image transmission mode is set to a second transmission mode.

8. The method as claimed in claim 7, wherein the image file is downloaded from a personal computer.

9. A method for communicating an image in a communication terminal having a storage for storing image files, comprising the steps of:

upon receipt of an incoming call, generating a call terminal tone and displaying a request message for setting an image transmission mode;

setting the image transmission mode according to a key input by a user;

performing a call while transmitting a real-time image, when the image transmission mode is set to a first transmission mode; and performing a call while transmitting a specific stored image file, when the image transmission mode is set to a second transmission mode.

10. The method as claimed in claim 9, wherein the first transmission mode is set by inputting a call start key.

* * * * *